May 19, 1959  E. H. ROSS  2,887,287
FISHING POLE HOLDER
Filed May 14, 1957
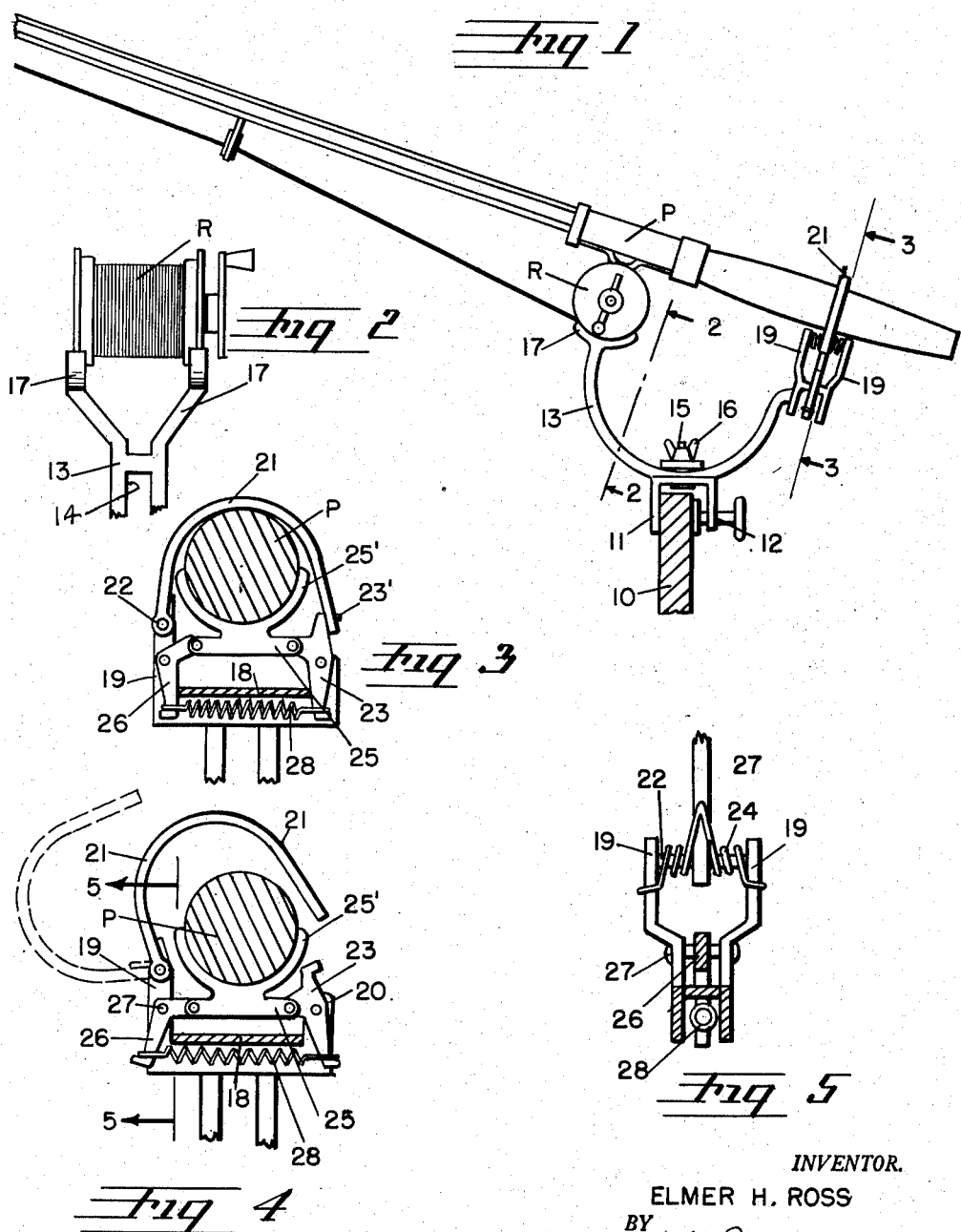
INVENTOR.
ELMER H. ROSS
BY
ATTORNEY

United States Patent Office 2,887,287
Patented May 19, 1959

2,887,287

FISHING POLE HOLDER

Elmer H. Ross, Medford, Oreg.

Application May 14, 1957, Serial No. 659,103

2 Claims. (Cl. 248—42)

This invention relates to means for holding and supporting a fishing pole, from which a hook and line have been cast by the fisherman, when the fisherman desires to be free of the pole while waiting for a strike.

The invention relates especially to adjustable holding means in which a fishing pole may be firmly held in a desired position while the holding means itself may be easily and removably secured on the gunwhale of a boat, or to a seat in the boat, or to any other suitable and relatively stationary supporting object.

While the invention may be used with fishing poles of various sizes and weights, equipped with reels of different types, this invention relates particularly to means for holding a pole adapted for use with large fish, such as salmon, for example, with which fish the fisherman will be obliged to grab the pole with both hands for manipulating the pole and line, after the fish has engaged the hook, due to the strength and weight of the fish to be landed.

Another important object of the present invention accordingly is to provide a fishing pole holder from which the pole can instantly be released by the fisherman while having both hands on the fishing pole.

Another object of the invention is to provide a fishing pole holder which will hold the pole firmly regardless of the amount of downward pull exerted on the fishing line and thus exerted on the extended outer or upper end of the pole while the pole is secured in the holder near the handle hand, but which, at the same time, will enable the pole to be released instantly by the fisherman when desired, as previously mentioned.

A further object of the invention is to provide a very simple and practical fishing pole holder, of the type indicated, which can be readily manufactured and made available to the public at very moderate cost, and which will be very easy to employ and presents no maintenance problem.

The manner in which these objects and other incidental advantages are attained with the fishing pole holder of the present invention, and the manner in which the holder is constructed and employed, will be readily understood from the following brief description wherein reference is made to the accompanying drawings:

In the drawings:

Figure 1 is a side elevation showing the fishing pole holder secured to the gunwhale of a boat, with the fishing pole being held by the holder;

Figure 2 is a fragmentary enlarged section on the line 2—2 of Figure 1 with the pole and reel omitted;

Figure 3 is an enlarged fragmentary section through the pole and holder taken on the line indicated at 3—3 in Figure 1;

Figure 4 is a section similar to Figure 3 but illustrating the holder in the process of releasing the fishing pole; and Figure 5 is a further enlarged fragmentary section taken on line 5—5 of Figure 4.

Referring first to Figure 1, the top edge of the gunwale of the boat (or any other suitable support) to which the fishing pole holder is secured is indicated at 10. The holder includes a clamp 11 of familiar, inverted U shape, which is removably clamped on the gunwhale 10 (or other support) by a manually operable clamping screw 12 provided with a suitable handle at the outer end and with a clamping disc at the inner end.

A curved main body 13, having an elongated, longitudinally-extending slot 14 (Figure 2), is adjustably secured on the clamp 11 by means of the bolt 15 which passes through the slot 14 and through a mounting aperture in the top of the clamp 11, the bolt 14 being equipped with the customary clamping washer and wing nut 16 as indicated in Figure 1. As obvious from Figure 1, the releasing of the wing nut 16 enables the position of the main body member 13 to be adjusted with respect to the clamp 11.

The forward end of the main body 13 is formed into a pair of spaced cradle members or open rest supports 17, 17 adapted to serve as a holding rest for the reel R of the fishing pole P. The rear end of the main body 13 carries the pole-securing assembly.

The pole-securing assembly includes an integral cross frame having an inverted U-shaped central base portion 18 with the ends of the central base portion extended and formed into two pairs of spaced, upwardly-extending arms 19, 19 and 20, 20 (only one of the arms 20, 20 being shown in the drawings). A curved pole locking member 21 is hingedly mounted at one end on a pin 22 extending between and secured in the arms 19, 19. The opposite end of the locking member 21 has an aperture (not shown) adapted to be engaged normally by an outwardly-extending finger 23' on a pivoted latch lever 23, which latch lever is shaped substantially as shown in Figures 3 and 4.

A coil spring 24 (Figure 5), carried on the hinge pin 22 and maintained under tension by the engagement of its ends with the arms 19, 19 respectively, has a central loop engaging the inner face of the locking member 21, and thus constantly exerts a tendency to swing the locking member 21 counterclockwise (as viewed in Figures 3 and 4). Thus, when the pivotally mounted latch lever 23 is moved from the position of Figure 3 into the releasing position of Figure 4, the locking member 21 immediately swings to the opening or broken line position shown in Figure 4.

A cradle 25 has its lower portion formed into a pair of parallel links which are pivotally connected at one end to the latch lever 23 and similarly pivotally connected at the other end to a bell crank 26. The bell crank in turn is pivotally mounted on a pin 27 secured in the arms 19, 19. The top portion of the cradle 25 is so shaped as to form a rest 25' for the handle of the fishing pole when placed in the support.

A coil spring 28, positioned within the inverted U-shaped base portion 18 of the cross frame is held under tension by having its ends connected respectively to the bottom of the latch lever 23 and the bottom of the bell crank 26. This coil spring 28 normally holds the latch lever 23 in engagement with the locking member 21 while also holding the cradle 25 in normal raised position. Thus the spring 28 normally holds the latch lever, the cradle, and the bell crank 26 in the relative positions illustrated in Figure 3, with the locking member 21 being held by the latch lever as shown. However, a momentary downward pressure on the cradle 25, sufficient to overcome the holding force of spring 28, will force the latch lever 23 and bell crank 26 to swing in opposite directions into the relative positions shown in Figure 4. The resulting movement, lowering the cradle 25 and moving the latch lever 23, moves the latter out of engagement with its aperture in the locking member 21 and releases the locking member 21.

From this brief description the manner in which the device is employed will be apparent. The fishing pole P, after the baited hook and line have been cast and the reel R for the line has been locked, is set in place on the device as shown in Figure 1. The reel R rests on the supporting front open rests 17, 17 and the pole handle is placed on the cradle 25, while the locking member 21 is set in place over the pole handle and engaged by the latch lever 23.

Obviously, when the fishing pole is thus mounted on the device, no downward pull on the outer or extending end of the pole will cause the locking member 21 to be released. However, all that is required to release the pole and to unlock the member 21 is to exert a momentary downward pressure on the pole handle sufficient to depress the cradle 25. Thus, when the fisherman desires to manipulate the line and pole in order to land a heavy fish and grabs the pole handle with both hands for this purpose, he merely presses down on the handle as he grabs the pole and the pole immediately becomes free.

I claim:

1. In a fishing pole holder of the character described having an adjustably mounted main body and an open rest at the front end of said body, a cross frame at the opposite end of said body, a curved pole-securing member hingedly mounted on one end of said cross frame and adapted when in closed position to extend over a fishing pole placed on the holder, a latch pivotally mounted on the opposite end of said cross frame for holding said member in closed position, cooperating engageable elements on said latch and on said member, a spring engaging said member and constantly exerting a force to swing said member to fully open position, a cradle support on said cross frame for the fishing pole, one end of said cradle pivotally connected with said latch, said cradle and said latch so arranged that said latch will be moved to disengaging position when said cradle is moved downwardly with respect to said cross frame, spring means normally holding said cradle in raised position and said latch in engaging position, whereby, when said member is in closed position and engaged by said latch, downward movement of said cradle against the force of said spring means will release said latch from said member and result in said member being swung to fully open position by said first mentioned spring.

2. A fishing pole holder including an adjustably mounted main body, a pair of open rest supports at the front end of said body adapted to engage the reel on the fishing pole, an integral cross frame at the opposite end of said body, a curved pole-securing member hingedly mounted on one end of said cross frame and adapted when in closed position to extend over a fishing pole placed on the holder, a latch pivotally mounted at the opposite end of said cross frame for holding said member in closed position, cooperating engageable elements on said latch and on said member, said latch having a lower bell crank portion, a spring engaging said member and constantly exerting a force to swing said member to fully open position, a bell crank lever pivotally mounted on said cross frame adjacent the hinge mounting for said member, a cradle on said cross frame for supporting the fishing pole, the ends of said cradle pivotally connected to said latch and to said bell crank lever respectively, said cradle and said latch so arranged that said latch will be moved to disengaging position when said cradle is moved downwardly with respect to said cross frame, a spring connecting said bell crank lever and said lower bell crank portion of said latch and normally holding said cradle in raised position and said latch in engaging position, whereby, when said member is in closed position and engaged by said latch, downward movement of said cradle against the force of said spring will release said latch from said member and result in said member being swung into fully open position by said first mentioned spring.

References Cited in the file of this patent

UNITED STATES PATENTS

| 1,837,939 | Zimmerman | Dec. 22, 1931 |
| 2,143,109 | Hadaway | Jan. 10, 1939 |
| 2,621,877 | Grigsby | Dec. 16, 1952 |